United States Patent
Hsieh et al.

(10) Patent No.: US 11,994,580 B2
(45) Date of Patent: May 28, 2024

(54) ELECTRONIC DEVICE AND METHOD FOR POSITIONING, IMAGING, DETECTING, POSTURE DISCRIMINATION, AND SHAPE DISCRIMINATION

(71) Applicant: Quanta Computer Inc., Taoyuan (TW)

(72) Inventors: Tsung-Ying Hsieh, Taoyuan (TW); Chi-Hsuan Lee, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 456 days.

(21) Appl. No.: 17/375,418

(22) Filed: Jul. 14, 2021

(65) Prior Publication Data

US 2022/0291376 A1    Sep. 15, 2022

(30) Foreign Application Priority Data

Mar. 10, 2021   (TW) ................................ 110108415

(51) Int. Cl.
*G01S 13/90* (2006.01)
*G01S 13/04* (2006.01)
*G01S 13/42* (2006.01)
*G01S 13/87* (2006.01)

(52) U.S. Cl.
CPC .............. *G01S 13/90* (2013.01); *G01S 13/04* (2013.01); *G01S 13/42* (2013.01); *G01S 13/87* (2013.01)

(58) Field of Classification Search
CPC .......... G01S 13/90; G01S 13/04; G01S 13/42; G01S 13/87
See application file for complete search history.

(56) References Cited

U.S. PATENT DOCUMENTS

| | | | |
|---|---|---|---|
| 2019/0094352 A1* | 3/2019 | Altenmueller | G01S 7/352 |
| 2021/0342620 A1* | 11/2021 | Miura | G06V 20/582 |
| 2022/0171052 A1* | 6/2022 | Ogura | G01N 22/00 |
| 2023/0039168 A1* | 2/2023 | Ogoshi | G01N 23/2251 |
| 2023/0333234 A1* | 10/2023 | Sahara | G01S 13/58 |
| 2023/0341538 A1* | 10/2023 | Isoda | G01S 7/2925 |

* cited by examiner

*Primary Examiner* — Bernarr E Gregory
*Assistant Examiner* — Hailey R Le
(74) *Attorney, Agent, or Firm* — McClure, Qualey & Rodack, LLP (57) ABSTRACT

An electronic device includes a plurality of radars and at least one processor. Each of the radars includes at least one transmitting antenna and a plurality of receiving antennas arranged as a two-dimensional array antenna. The processor converts the RF signal received by the receiving antennas into a ranging profile that records the distance between each of the receiving antennas and the target and the receiving intensity corresponding to the distance. The processor generates a voxel profile to indicate the relationship between the distance and the receiving intensity in three-dimensional space. The processor performs a point generation algorithm to generate a plurality of points in three-dimensional space according to the voxel profile and the receiving intensity threshold. The processor performs a cluster analysis algorithm to identify a plurality of target points corresponding to the target among the points to obtain the position of the target.

9 Claims, 5 Drawing Sheets

ELECTRONIC DEVICE AND METHOD FOR POSITIONING, IMAGING, DETECTING, POSTURE DISCRIMINATION, AND SHAPE DISCRIMINATION

CROSS REFERENCE TO RELATED APPLICATIONS

This application claims priority of and the benefit of Taiwan Application No. 110108415, filed on Mar. 10, 2021, the entirety of which are incorporated by reference herein.

FIELD OF THE DISCLOSURE

The disclosure is related to an electronic device, and in particular it is related to an electronic device and method for positioning, imaging, detecting, posture discrimination, and shape discrimination.

DESCRIPTION OF THE RELATED ART

Existing indoor positioning systems need to be equipped with a positioning tag on a target to be tested, and multiple indoor positioners need to be installed in the indoor space to receive wireless signals (such as Bluetooth, Zigbee, RFID, Wi-Fi, etc.) from the positioning tags in order to complete the task of positioning. On the other hand, existing indoor positioning systems also use visual positioning technology that uses a visual sensor (such as a camera) to collect information on the target to be measured to confirm the actual position of the target based on the captured image.

However, in the technology using positioning tags and positioners, since the target to be tested must carry the positioning tags, when an unexpected person suddenly enters the area to be tested, the person cannot be detected immediately. On the other hand, technology that uses positioning tags and positioners cannot detect the posture or shape of a target. With visual positioning technology, when there are two targets to be tested in the same image at the same time, and the distance between these two targets is quite small, blind spots may occur, making the visual positioning technology unable to clearly distinguish the two targets, resulting in indoor positioning failure.

BRIEF SUMMARY OF THE DISCLOSURE

In order to resolve the issue described above, the present disclosure provides an electronic device for positioning, imaging, detecting, posture discrimination and shape discrimination of a target. The electronic device includes a plurality of radars and at least one processor. Each of the radars includes at least one transmitting antenna and a plurality of receiving antennas. The receiving antennas are arranged as a two-dimensional array antenna. The processor converts the RF signal received by the receiving antennas into a ranging profile, wherein the ranging profile records the distance between each of the receiving antennas and the target, and it also records the receiving intensity corresponding to the distance. The processor generates a voxel profile to indicate the relationship between the distance and the receiving intensity in three-dimensional space. The processor performs a point generation algorithm to generate a plurality of points in three-dimensional space according to the voxel profile and the receiving intensity threshold. The processor obtains the position of the target by performing a cluster analysis algorithm to identify a plurality of target points corresponding to the target among the points.

According to the electronic device disclosed above, the radars are frequency modulated continuous wave (FMCW) radars, pulse radars, pulse Doppler radars, pulse coherent radars, orthogonal frequency-division multiplexing (OFDM) radars, or stepped frequency continuous wave (SFCW) radars.

According to the electronic device disclosed above, when the radars are FMCW radars, the processor converts the RF signal received by the receiving antennas into the ranging profile using a Fast Fourier Transform (FFT).

According to the electronic device disclosed above, when the radars are FMCW radars, the transmitting antenna of each of the radars transmits RF signals whose frequency changes over time, and the processor calculates the distance between the receiving antennas and the target according to the frequency of the RF signal received by the receiving antennas.

According to the electronic device disclosed above, the processor controls the transmission period of the transmitting antenna of each of the radars so that the transmitting antenna sequentially transmits the RF signal at a predetermined time interval.

According to the electronic device disclosed above, the processor performs the point generation algorithm, including: regarding a coordinate point and the area surrounding the coordinate point as having no point in three-dimensional space in the voxel profile when the difference between the receiving intensity of the coordinate point corresponding to the distance and the receiving intensity around the coordinate point is less than or equal to the receiving intensity threshold; and regarding the coordinate point and the area surrounding the coordinate point as the same point in three-dimensional space in the voxel profile when the difference between the receiving intensity of the coordinate point corresponding to the distance and the receiving intensity around the coordinate point is greater than the receiving intensity threshold.

According to the electronic device disclosed above, the processor performs the cluster analysis algorithm, including: regarding one of the points and its neighboring points as being in the same cluster in three-dimensional space when the distance between the point and its neighboring points is within a preset distance; and regarding all points in the cluster in three-dimensional space as target points corresponding to the target when the number of all points included in the cluster is greater than a preset number.

According to the electronic device disclosed above, the point generation algorithm includes an ordered statistic CFAR (OS-CFAR). The cluster analysis algorithm includes a Density-Based Spatial Clustering of Applications with Noise algorithm.

The present disclosure also provides a method for positioning, imaging, detecting, posture discrimination and shape discrimination of a target. The method is applicable for use in an electronic device including a plurality of radars and at least one processor. Each of the radars includes at least one transmitting antenna and a plurality of receiving antennas arranged in an array antenna. The method includes: converting the RF signal received by the receiving antennas into a ranging profile; wherein the ranging profile records the distance between each of the receiving antennas and the target, and the receiving intensity corresponding to the distance; generating a voxel profile to indicate the relationship between the distance and the receiving intensity in three-dimensional space; performing a point generation algorithm to generate a plurality of points in three-dimensional space according to the t voxel profile and the receiving intensity threshold; and performing a cluster analysis algorithm to identify a plurality of target points corresponding to the target among the points to obtain the position of the target.

According to the method disclosed above, performing the point generation algorithm includes: regarding a coordinate point and the area surrounding the coordinate point as having no point in three-dimensional space in the voxel profile when the difference between the receiving intensity of the coordinate point corresponding to the distance and the receiving intensity around the coordinate point is less than or equal to the receiving intensity threshold; and regarding the coordinate point and the area surrounding the coordinate point as the same point in three-dimensional space in the voxel profile when the difference between the receiving intensity of the coordinate point corresponding to the distance and the receiving intensity around the coordinate point is greater than the receiving intensity threshold.

According to the method disclosed above, performing the cluster analysis algorithm includes: regarding one of the points and its neighboring points as being in the same cluster in three-dimensional space when the distance between the point and its neighboring points is within a preset distance; and regarding all points in the cluster in three-dimensional space as target points corresponding to the target when the number of all points included in the cluster is greater than a preset number.

BRIEF DESCRIPTION OF THE DRAWINGS

The disclosure can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the disclosure.

DETAILED DESCRIPTION OF THE DISCLOSURE

In order to make the above purposes, features, and advantages of some embodiments of the present disclosure more comprehensible, the following is a detailed description in conjunction with the accompanying drawings.

It should be understood that the words "comprise" and include used in the present disclosure are used to indicate the existence of specific technical features, values, method steps, operations, units and/or components. However, it does not exclude that more technical features, numerical values, method steps, work processes, units, components, or any combination of the above can be added.

The words "first", "second", "third", "fourth", "fifth", and "sixth" are used to describe components, they are not used to indicate the priority order of or advance relationship, but only to distinguish components with the same name.

Figure 1A:
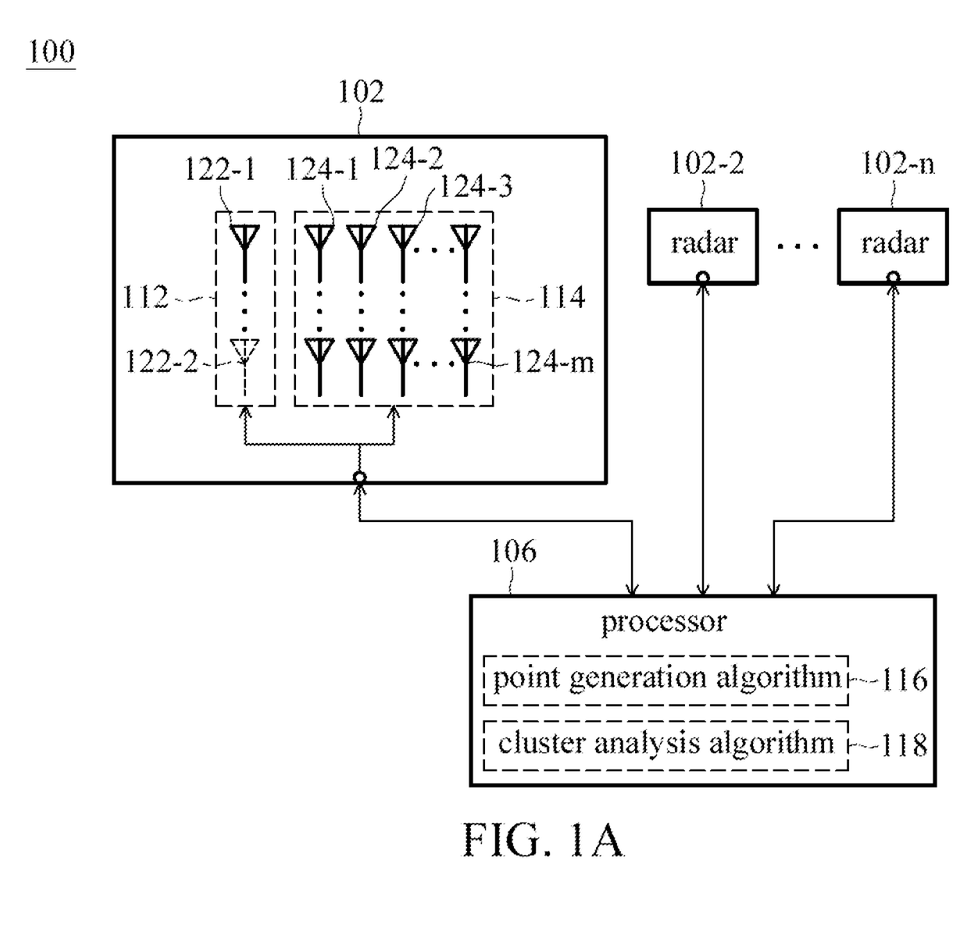
FIG. 1A is a schematic diagram of an electronic device 100 having a processor to perform centralized calculations in accordance with some embodiments of the disclosure.

FIG. 1A is a schematic diagram of an electronic device 100 having a processor to perform centralized calculations in accordance with some embodiments of the disclosure. The electronic device 100 is used to positioning at least one target. As shown in FIG. 1A, the electronic device 100 includes a plurality of radars (for example, radars 102, 102-2, . . . , 102-$n$) and a processor 106. In some embodiments, the radars are installed at different locations in an indoor space. For example, the radar 102 may be installed on the ceiling in the indoor space, the radar 102-2 may be installed on a first wall in the indoor space, and the radar 102-3 may be installed on a second wall in the indoor space. In some embodiments, the ceiling, the first wall, and the second wall in the indoor space are orthogonal to each other, so that the electronic device 100 positions the targets more accurately, and the blind spots in the positioning process are reduced.

For example, when there are two targets in the indoor space, and the radar 102-2 shows that the two targets are overlapped with each other on its radar cross section, at this time, the electronic device 100 must rely on the radar 102 and the 102-3 to detect the two targets from different directions, so that the electronic device 100 can clearly distinguish the two targets in the indoor space, and calculate the exact positions of the two targets in the indoor space. In some embodiments, the greater the number of radars included in the electronic device 100 is, the more accurate the positions of the targets in the indoor space calculated by the radars are.

In some embodiments, the structures of the radars 102, 102-2, . . . , 102-$n$ in the electronic device 100 may be the same or different from each other. The structure of the radar 102 is taken as an example below. As shown in FIG. 1A, the radar 102 includes at least one transmitting antenna 112 and a plurality of receiving antenna 114. The transmitting antenna 112 may include a transmitting antenna 122-1 and a transmitting antenna 122-2. The receiving antenna 114 may include receiving antennas 124-1, 124-2, 124-3, . . . , 124-$m$. In some embodiments, the receiving antennas 124-1, 124-2, 124-3, . . . , 124-$m$ are arranged as an array antenna, and the transmitting antennas 122-1 and 122-2 are arranged adjacent to the receiving antennas 124-1, 124-2, 124-3, . . . , 124-$m$.

In some embodiments, radars 102, 102-2, . . . , 102-$n$ are frequency modulated continuous wave (FMCW) radars, pulse Doppler radars, pulse coherent radars, orthogonal frequency-division multiplexing (OFDM) radars, or stepped frequency continuous wave (SFCW) radars, but the present disclosure is not limited thereto. In some embodiments, radars 102, 102-2, . . . , 102-$n$ are traditional pulse radars. In some embodiments, the processor 106 may be arranged in any computer device, such as a desktop, a laptop, a smartphone, a tablet, and a workstation server, etc., but the present disclosure is not limited thereto.

The processor 106 is electrically coupled to the radars 102, 102-2, ..., 102-n. Taking the radar 102 as an example, the processor 106 may send a transmitting command to the radar 102. When the radar 102 receives the transmitting command, the radar 102 may correspondingly transmit RF signals through the transmitting antenna 112. In some embodiments, the processor 106 may also receive the RF signals reflected from the target received by each of the receiving antennas 114 of the radar 102, and may convert the RF signals received by each of the receiving antennas 114 into a ranging profile. In some embodiments, the ranging profile records the distance between each of the receiving antennas 114 and the target, and the receiving intensity corresponding to the distance. In some embodiments, each of the radars 102, 102-2, ..., 102-n may additionally include a microprocessor (not shown) to calculate the distance between the target and each of the radars 102, 102-2, ..., 102-n based on the information from the RF signal reflected by the target. The microprocessor then transmits the distance information corresponding to each of the radars 102, 102-2, ..., 102-n to the processor 106 in the form of digital signals for the processor 106 to perform subsequent processing.

In some embodiments, taking the radar 102 as an example, the processor 106 generates a voxel profile according to the ranging profile corresponding to the receiving antennas 124-1, 124-2, 124-3, ..., 124-m. The voxel profile is used to indicate the relationship between the distance and the receiving intensity between the target and each radar in three-dimensional space. For example, the voxel data can be a visualized three-dimensional pixel image, and the type or depth of color is used to mark the magnitude of the receiving intensity corresponding to the distance between the target and each radar. For example, it is assumed that the coordinate point A and the coordinate point B in the voxel map both correspond to different distances between the target and the receiving antenna 124-1 of the radar 102. When the visualized color of coordinate point A is red, and the visualized color of point B is light blue, it means that the receiving antenna 124-1 at the distance corresponding to the coordinate point A obtains a greater receiving intensity than at the distance corresponding to the coordinate B.

Then, the processor 106 performs a point generation algorithm 116. The processor 106 generates a plurality of points in three-dimensional space according to the voxel profile (such as the above-mentioned three-dimensional pixel image) and a preset receiving intensity threshold. In some embodiments, the point generation algorithm 116 may be an ordered statistic CFAR (OS-CFAR) algorithm. Furthermore, the processor 106 further performs a cluster analysis algorithm 118 to identify a plurality of target points corresponding to the target among the points to obtain the position of the target.

Figure 1B:
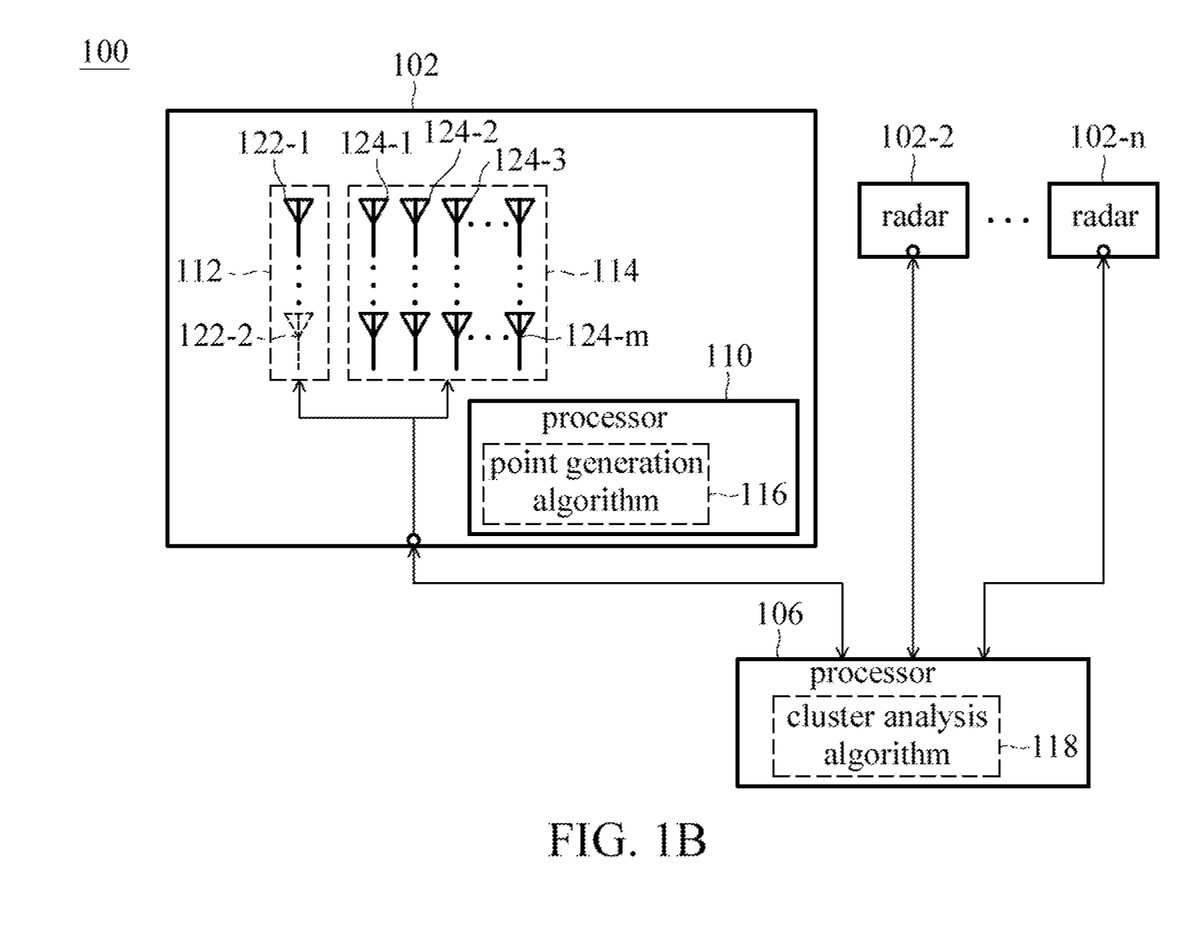
FIG. 1B is a schematic diagram of an electronic device 100 having multiple processors to perform distributed calculations in accordance with some embodiments of the disclosure.

FIG. 1B is a schematic diagram of an electronic device 100 having multiple processors to perform distributed calculations in accordance with some embodiments of the disclosure. The biggest difference between FIG. 1B and FIG. 1A is that the point generation algorithm 116 is directly executed by the processor (for example, the processor 110 of the radar 102) included in each radar. For example, taking the radar 102 as an example, the processor 110 receives the RF signals reflected from the target received by each of the receiving antennas 114 of the radar 102, and converts the RF signals received by each of the receiving antennas 114 into a ranging profile. The processor 110 generates a voxel profile according to the distance measurement data corresponding to the receiving antennas 124-1, 24-2, 124-3, ..., 124-m. After that, the processor 110 then performs the point generation algorithm 116. The processor 110 generates a plurality of points in three-dimensional space according to the voxel profile (such as the above-mentioned three-dimensional pixel image) and a preset receiving intensity threshold. Furthermore, the processor 110 transmits the generated points to the processor 106, so that the processor 106 can perform the cluster analysis algorithm 118 according to the points from the processor 110.

Figure 2:
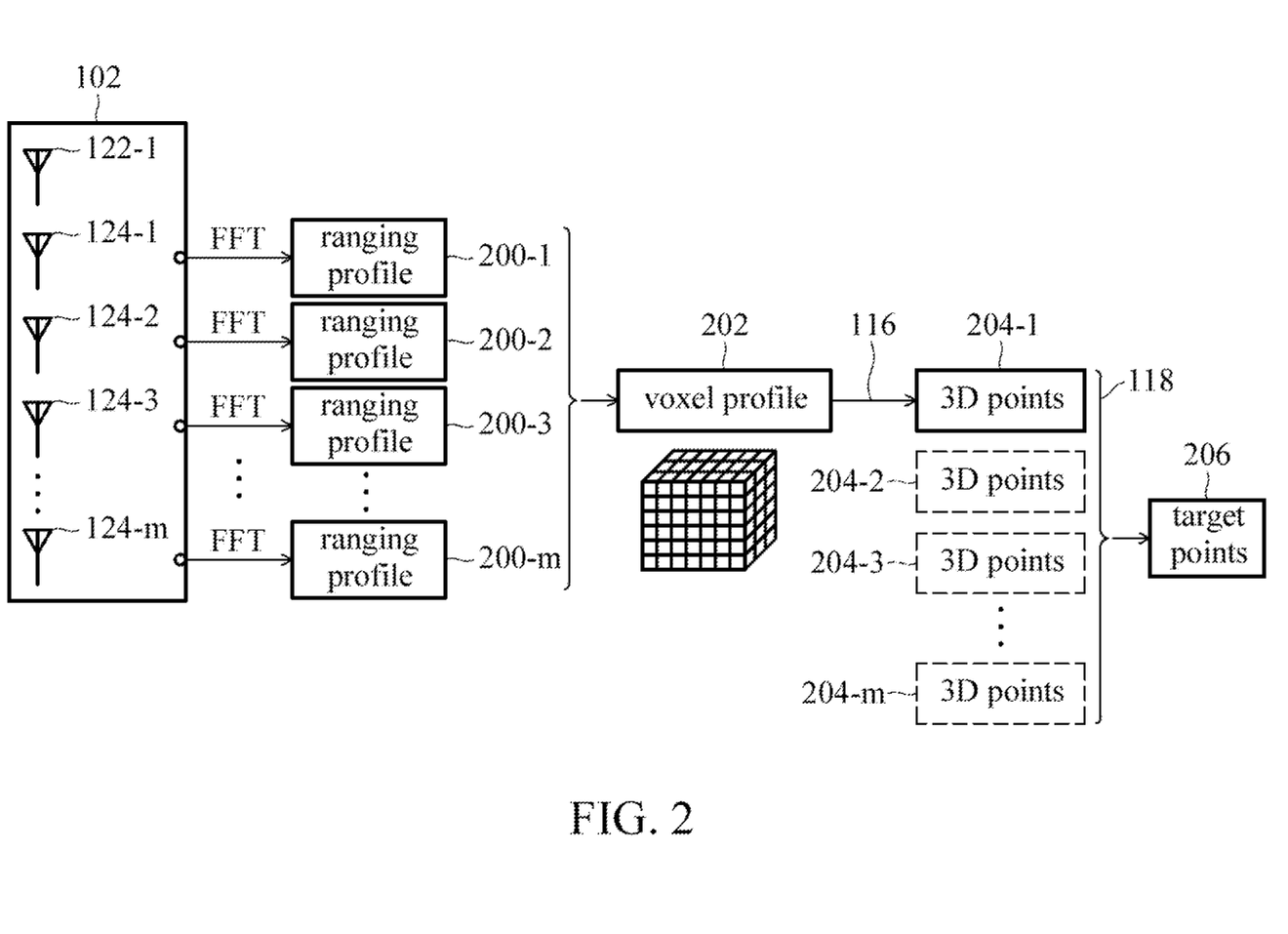
FIG. 2 is a schematic diagram of the electronic device 100 in FIG. 1A processing an RF signal from a radar 102 in accordance with some embodiments of the disclosure.

FIG. 2 is a schematic diagram of the electronic device 100 in FIG. 1A processing an RF signal from a radar 102 in accordance with some embodiments of the disclosure. In some embodiments in FIG. 2, the radars of the electronic device 100 is an FMCW radar. Therefore, as shown in FIG. 2, the transmitting antenna 122-1 of the radar 102 transmits a RF signal whose frequency changes over time (for example, the frequency increases linearly over time). The radio frequency signal whose frequency changes over time is reflected by the target and received by the receiving antennas 124-1, 124-2, 124-3, ..., 124-m of the radar 102. The processor 106 then calculates the distance between the receiving antennas 124-1, 124-2, 124-3, ..., 124-m and the target according to the frequency of the RF signal received by the receiving antennas 124-1, 124-2, 124-3, ..., 124-m. The processor 106 of FIG. 1A uses Fast Fourier Transform (FFT) to convert the RF signals whose frequency changes over time received by the receiving antennas 124-1, 124-2, 124-3, ..., 124-m into the ranging profile.

For example, the processor 106 converts the RF signal received by the receiving antenna 124-1 into the ranging profile 200-1, converts the RF signal received by the receiving antenna 124-2 into the ranging profile 200-2, converts the RF signal received by the receiving antenna 124-3 into a ranging profile 200-3, and coverts the RF signal received by the receiving antenna 124-m into a ranging profile 200-m through FFT. In other words, the ranging profile 200-1 records the distance between the receiving antenna 124-1 and the target, and the receiving intensity corresponding to the distance. The ranging profile 200-2 records the distance between the receiving antenna 124-2 and the target, and the receiving intensity corresponding to the distance.

Next, the processor 106 performs data fusion on the ranging profile 200-1, 200-2, 200-3, ..., 200-m to generate a voxel profile 202. In other words, the processor 106 superimposes the distance between the receiving antenna 124-1 and the target and the corresponding receiving intensity, the distance between the receiving antenna 124-2 and the target and the corresponding receiving intensity, the distance between the receiving antenna 124-3 and the target and the corresponding receiving intensity, and the distance between the receiving antenna 124-m and the target and the corresponding receiving intensity in three-dimensional space to generate the voxel profile 202. In some embodiments, a pixel in three-dimensional space of the voxel profile 202 (for example, the voxel diagram depicted under the voxel profile 202 in FIG. 2, or a coordinate point) can represent the receiving intensity corresponding to a certain distance (for example, the distance between the target and the receiving antennas).

After that, the processor 106 performs the point generation algorithm to generate 3D points 204-1 (different from the pixel in the 3D space in the voxel profile 202) in three-dimensional space of voxel profile 202 according to the voxel profile 202 and a preset receiving intensity threshold. In detail, when the difference between the receiving intensity of the coordinate point corresponding to the distance and the receiving intensity around a coordinate point is less than or equal to the receiving intensity threshold, the processor 106 regards the coordinate point and the area surrounding the coordinate point as having no point in three-dimensional space in the voxel profile 202. When the difference between the receiving intensity of the coordinate point corresponding to the distance and the receiving intensity around the coordinate point is greater than the receiving intensity threshold, the processor 106 regards the coordinate point and the area surrounding the coordinate point as the same point in three-dimensional space in the voxel profile 202.

For example, assume that there is a coordinate point C in three-dimensional space of the voxel profile 202, and the corresponding receiving intensity value is 40. In the same three-dimensional space, there is a coordinate point D adjacent to the coordinate point C, and the corresponding receiving intensity value is 25. Therefore, when the receiving intensity threshold is set to 10, since the receiving intensity threshold is less than or equal to the difference between the coordinate point C and the coordinate point D corresponding to the receiving intensity (for example, the difference is 15), the processor 106 may regard the coordinate point C and the coordinate point D as the same point in three-dimensional space. When the receiving intensity threshold is 20, since the receiving intensity threshold is greater than the difference between the coordinate point C and the coordinate point D (for example, the difference is 15), the processor 106 may regards the coordinate point C and the coordinate point D as different points in three-dimensional space. In some embodiments, the receiving intensity can be represented by a signal-to-noise ratio (SNR), but the present disclosure is not limited thereto.

Similarly, the processor 106 also performs the point generation algorithm 116 to generate 3D points 204-2, 204-3, . . . , 204-m corresponding to the receiving intensity of the receiving antennas 124-2, 124-3, . . . , 124-m. After that, the processor 106 superimposes the 3D points 204-1, 204-2, 204-3, . . . , 204-m in the same three-dimensional space as a pre-work for performing the cluster analysis algorithm 118. Finally, the processor 106 performs the cluster analysis algorithm 118 to identify the target points 206 corresponding to the target in the superimposed result of the 3D points 204-2, 204-3, . . . , 204-m, and to obtain the position of the target. In some embodiments, the cluster analysis algorithm 118 is a Density-Based Spatial Clustering of Applications with Noise algorithm.

In detail, when the distance between one of the 3D points 204-2, 204-3, . . . , 204-m and its neighboring points is within a preset distance, the processor 106 regards the point in the superimposed result of the 3D points 204-2, 204-3, . . . , 204-m as being in the same cluster with its neighboring points in three-dimensional space. When the total number of points included in the cluster of the point in the superimposed result of the 3D points 204-2, 204-3, . . . , 204-m is greater than a preset number, the processor 106 regards all points in the cluster as target points 206 corresponding to the target.

For example, assume that there is a point E and another point F in 3D points 204-1, and the distance between the point E and the point F in three-dimensional space is 30 (arbitrary length unit). When the preset distance is 50, since the distance between the point E and the point F is within the preset distance (that is, the distance between the point E and the point F is less than or equal to the preset distance), the processor 106 regards the point E and the point F as being in the same cluster. Furthermore, the processor 106 performs clustering judgment and classification on all points in the superimposed result of the 3D points 204-2, 204-3, . . . , 204-m according to the same rule. In other words, as the number of judged points increases, the cluster including the point E and the point F may become larger and larger. When the total number of the points included in the cluster including the point E and the point F is greater than the preset number (for example, 100 points) and there is only one target in the indoor space, the processor 106 regards all the points included in the cluster including the point E and the point F as target points corresponding to the target.

When the preset distance is 20, since the distance between the point E and the point F is outside the preset distance (that is, the distance between the point E and the point F is greater than the preset distance), the processor 106 regards the point E and the point F as being in different clusters. The processor 106 performs clustering judgment and classification on all points in the superimposed result of the 3D points 204-2, 204-3, . . . , 204-m according to the same rule. In other words, as the number of judged points increases, the range of the first cluster including the point E and the second cluster including the point F may become larger and larger. In the case where there are two targets in the indoor space, the processor 106 regards that all the points included in the first cluster including the point E as one of the two targets, and regards that all the points included in the second cluster including the point F as the other one of the two targets. In other words, the position of the first cluster is the position of one of the two targets, and the position of the second cluster is the position of the other of the two targets. Regardless of the number of targets, the processor 106 of the electronic device 100 of the present disclosure may perform the cluster analysis algorithm 118 to finally obtain the exact position of the target in the indoor space.

Figure 3:
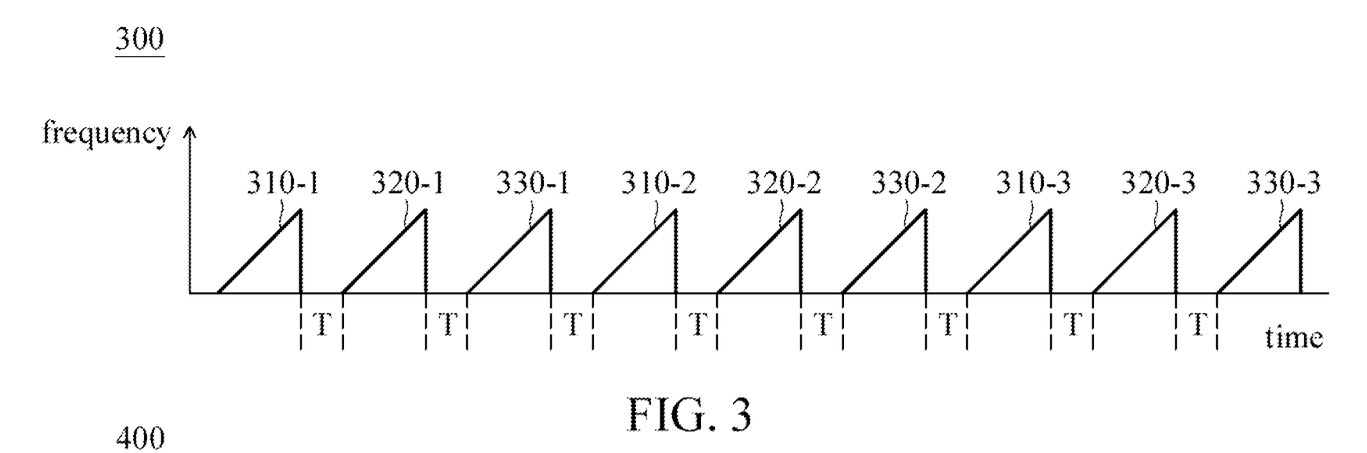
FIG. 3 is a waveform diagram of an RF signal transmitted by a radar having a single transmitting antenna controlled by a processor 106 in FIG. 1A in accordance with some embodiments of the disclosure.

FIG. 3 is a waveform diagram of an RF signal transmitted by a radar having a single transmitting antenna controlled by a processor 106 in FIG. 1A in accordance with some embodiments of the disclosure. For example, the processor 106 controls the transmitting antenna 122-1 in the radar 102, a transmitting antenna (not shown) of the radar 102-2, and a transmitting antenna (not shown) of the radar 102-3 (for example, the radar 102-n in FIG. 1A is the radar 102-3). In the waveform diagram 300 in FIG. 3, the horizontal axis is time and the vertical axis is frequency. Therefore, the transmitting antenna 122-1 of the radar 102 and the transmitting antennas of the radars 102-2 and 102-3 all transmit the RF signals whose frequency increases linearly with time. In detail, the RF signals 310-1, 310-2, and 310-3 are transmitted by the transmitting antenna 122-1 of the radar 102. The RF signals 320-1, 320-2, and 320-3 are transmitted by the transmitting antenna of the radar 102-2. The RF signals 330-1, 330-2, and 330-3 are transmitted by the transmitting antenna of the radar 102-3.

In some embodiments of FIG. 3, the processor 106 controls the transmission period of a transmitting antenna of each radars 102, 102-2, 102-3, so that the transmitting antenna of each radar 102, 102-2, 102-3 transmits RF signals sequentially at a predetermined time interval (T). In some embodiments, the preset time interval (T) can be set according to the distance between the radar and the target. For example, when the maximum detection range of the radars 102, 102-2, and 102-3 is R, then T=2R/C, where C is the speed of light.

Figure 4:
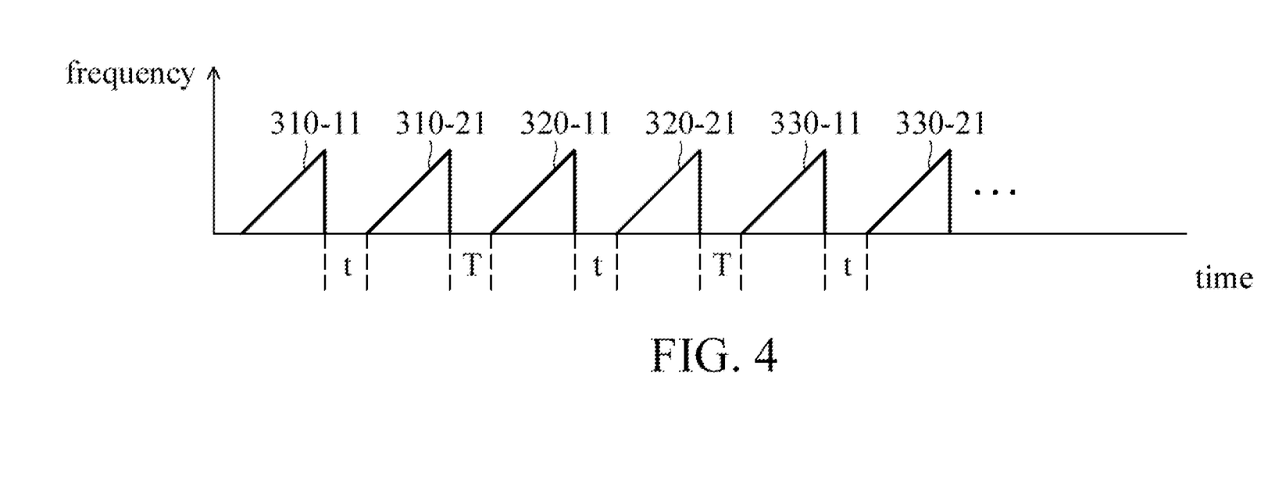
FIG. 4 is a waveform diagram of an RF signal transmitted by a radar having two single transmitting antennas controlled by the processor 106 in FIG. 1A in accordance with some embodiments of the disclosure.

FIG. 4 is a waveform diagram of an RF signal transmitted by a radar having two single transmitting antennas controlled by the processor 106 in FIG. 1A in accordance with some embodiments of the disclosure. For example, the processor 106 controls the transmitting antennas 122-1 and 122-2 in the radar 102, two of the transmitting antennas (not shown) of the radar 102-2, and two of the transmitting antennas (not shown) of the radar 102-3 (for example, the radar 102-n in FIG. 1A is the radar 102-3). In the wave form diagram 400 in FIG. 4, similarly, the horizontal axis is time and the vertical axis is frequency. Therefore, the transmitting antennas 122-1 and 122-2, and the two transmitting antennas of the radars 102-2 and 102-3 respectively transmits the RF signal whose frequency increases linearly with time.

In detail, the waveform 310-11 is transmitted by the transmitting antenna 122-1 of the radar 102, and the RF signal 310-21 is transmitted by the transmitting antenna 122-2 of the radar 102. The RF signal 320-11 is transmitted by the first transmitting antenna of the radar 102-2, and the RF signal 320-21 is transmitted by the second transmitting antenna of the radar 102-2. The RF signal 330-11 is transmitted by the first transmitting antenna of the radar 102-3, and the RF signal 330-21 is transmitted by the second transmitting antenna of the radar 102-3. In some embodiments in FIG. 4, the processor 106 can control the internal transmission time interval (t) between two transmitting antennas in the same radar, and can also control the preset time interval (T) between the transmitting antennas of different radars. In some embodiments, the internal transmission time interval (t) can also be set according to the distance between the radar and the target.

In some embodiments, when the radars of the electronic device 100 are pulse radars, take the radar 102 as an example, the processor 106 calculates the distance between the target and each of the receiving antennas 114 according to the time difference between the pulse signal transmitted by the transmitting antenna 112 and the pulse signal reflected by the receiving antenna 114 to receive ranging profile. The ranging profile still records the distance between each of the receiving antennas 114 and the target, and the receiving intensity corresponding to the distance. Similarly, the processor 106 generates a voxel profile based on the ranging profile, and performs the point generation algorithm 116 and the cluster analysis algorithm 118 to finally identify a plurality of target points corresponding to the target, thereby obtaining the position of the target.

Figure 5:
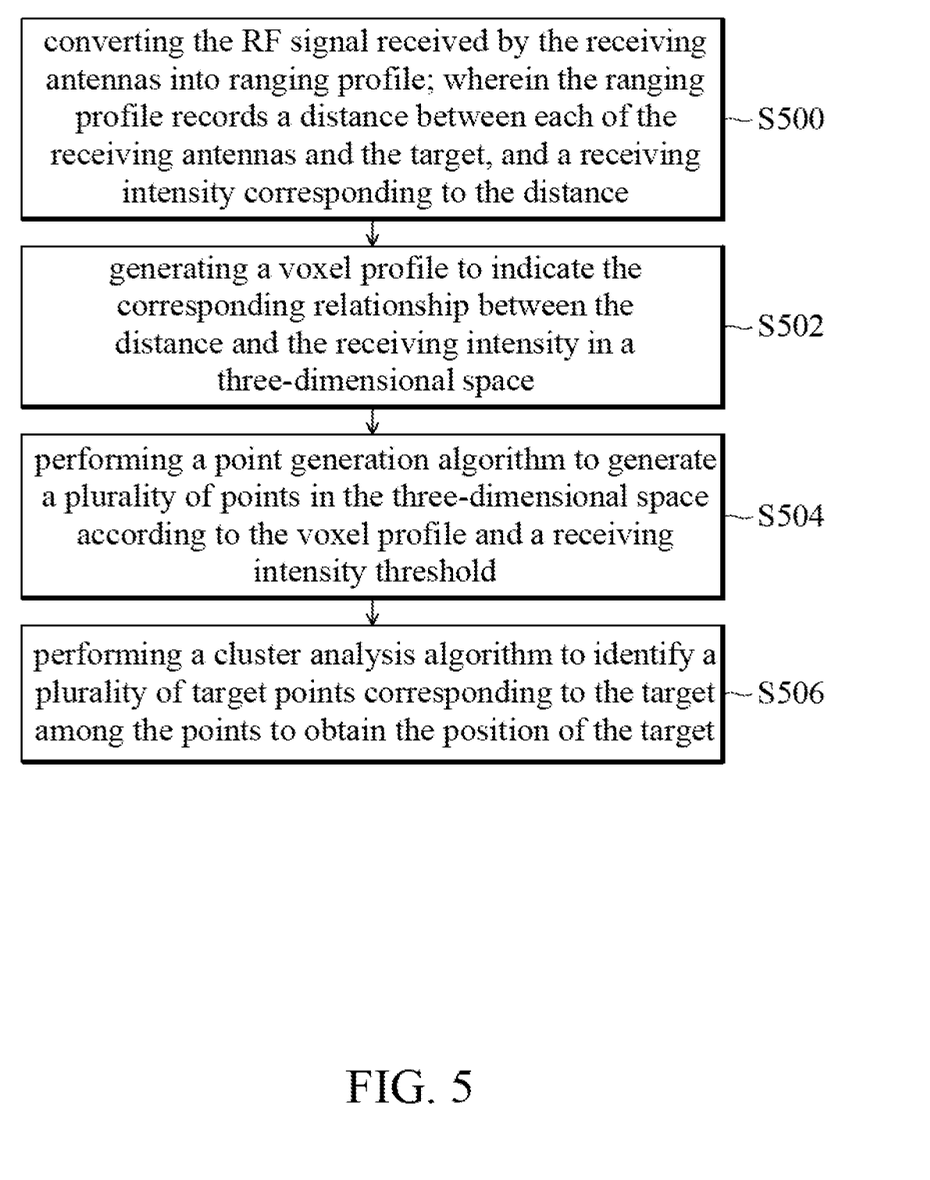
FIG. 5 is a flow chart of a method for positioning, imaging, detecting, posture discrimination and shape discrimination of a target in accordance with some embodiments of the disclosure.

FIG. 5 is a flow chart of a method for positioning, imaging, detecting, posture discrimination and shape discrimination of a target in accordance with some embodiments of the disclosure. The method of the present disclosure is used for positioning, imaging, detecting, posture discrimination and shape discrimination of a target, and is applicable for use in an electronic device including a plurality of radars and at least one processor. Each of the radars includes at least one transmitting antenna and multiple receiving antennas arranged in an array antenna. As shown in FIG. 5, the method of the present disclosure first converts the RF signal received by the receiving antennas into a ranging profile, the ranging profile records the distance between each of the receiving antennas and the target, and the receiving intensity corresponding to the distance (step S500). Then, the method of the present disclosure generates a voxel profile to indicate the relationship between the distance and the receiving intensity in three-dimensional space (step S502). After that, the method of the present disclosure performs a point generation algorithm (for example, the point generation algorithm 116 in FIGS. 1A and 1B) to generate a plurality of points in three-dimensional space according to the voxel profile and the receiving intensity threshold (step S504). Finally, the method of the present disclosure performs a cluster analysis algorithm (for example, the cluster analysis algorithm 118 in FIGS. 1A and 1B) to identify a plurality of target points corresponding to the target among the points to obtain the position of the target (step S506). In some embodiments, the processor 106 of the electronic device 100 in FIG. 1A executes steps S500, S502, S504 and S506. In some embodiments, the processor 110 in FIG. 1B executes steps S500, S502, and S504, and the processor 106 in FIG. 1B executes step S506. In some embodiments, the processor 106 in FIG. 1A (or the processor 110 in FIG. 1B) executing step S504 includes: regarding a coordinate point and the area surrounding the coordinate point as having no point in three-dimensional space in the voxel profile obtained in step S502 when the difference between the receiving intensity of the coordinate point corresponding to the distance and the receiving intensity around the coordinate point is less than or equal to the receiving intensity threshold; and regarding the coordinate point and the area surrounding the coordinate point as the same point in three-dimensional space in the voxel profile obtained in step S502 when the difference between the receiving intensity of the coordinate point corresponding to the distance and the receiving intensity around the coordinate point is greater than the receiving intensity threshold.

In some embodiments, the processor 106 in FIGS. 1A and 1B executing step S506 includes: regarding one of the points and its neighboring points as being in the same cluster in three-dimensional space when the distance between the point and its neighboring points is within a preset distance; and regarding all points in the cluster in three-dimensional space as target points corresponding to the target when the number of all points included in the cluster is greater than a preset number.

The embodiments of the present disclosure are disclosed above, but they are not used to limit the scope of the present disclosure. A person skilled in the art can make some changes and retouches without departing from the spirit and scope of the embodiments of the present disclosure. Therefore, the scope of protection in the present disclosure shall be defined by the scope of the attached claims.

What is claimed is:

1. An electronic device for positioning, imaging, detecting, posture discrimination and shape discrimination of a target, comprising:
   a plurality of radars, wherein each of the radars comprises at least one transmitting antenna and a plurality of receiving antennas, and the receiving antennas are arranged as a two-dimensional array antenna;
   at least one processor, operative to:
   convert the RF signal received by the receiving antennas into a ranging profile; wherein the ranging profile records a distance between each of the receiving antennas and the target and a receiving intensity corresponding to the distance;
   generate a voxel profile to indicate the relationship between the distance and the receiving intensity in three-dimensional space;
   perform a point generation algorithm to generate a plurality of points in three-dimensional space according to the voxel profile and a receiving intensity threshold, wherein the point generation algorithm comprises regarding a coordinate point and the area surrounding the coordinate point as having no point in three-dimensional space in the voxel profile when the difference between the receiving intensity of the coordinate point corresponding to the distance and the receiving intensity around the coordinate point is less than or equal to the receiving intensity threshold, and regarding the coordinate point and the area surrounding the coordinate point as the same point in three-dimensional space in the voxel profile when the difference between the receiving intensity of the coordinate point corresponding to the distance and the receiving intensity around the coordinate point is greater than the receiving intensity threshold; and perform a cluster analysis algorithm to identify a plurality of target points corresponding to the target among the points to obtain the position of the target.

2. The electronic device as claimed in claim 1, wherein the radars are frequency modulated continuous wave (FMCW) radars, pulse radars, pulse Doppler radars, pulse coherent radars, orthogonal frequency-division multiplexing (OFDM) radars, or stepped frequency continuous wave (SFCW) radars.

3. The electronic device as claimed in claim 2, wherein when the radars are FMCW radars, the processor converts the RF signal received by the receiving antennas into the ranging profile using a Fast Fourier Transform (FFT).

4. The electronic device as claimed in claim 2, wherein when the radars are FMCW radars, the transmitting antenna of each of the radars transmits RF signals whose frequency changes over time, and the processor calculates the distance between the receiving antennas and the target according to the frequency of the RF signal received by the receiving antennas.

5. The electronic device as claimed in claim 1, wherein the processor is further operative to control the transmission period of the at least one transmitting antenna of each of the radars, so that the at least one transmitting antenna sequentially transmits the RF signal at a predetermined time interval.

6. The electronic device as claimed in claim 1, wherein the processor performs the cluster analysis algorithm, comprising:

regarding one of the points and its neighboring points as being in the same cluster in three-dimensional space when the distance between the one of the points and its neighboring points is within a preset distance; and regarding all points in the cluster in three-dimensional space as target points corresponding to the target when the number of all points included in the cluster is greater than a preset number.

7. The electronic device as claimed in claim 1, wherein the point generation algorithm comprises an ordered statistic CFAR (OS-CFAR); and the cluster analysis algorithm comprises a Density-Based Spatial Clustering of Applications with Noise algorithm.

8. A method for positioning, imaging, detecting, posture discrimination and shape discrimination of a target, applicable to an electronic device comprising a plurality of radars and at least one processor, wherein each of the radars comprises at least one transmitting antenna and a plurality of receiving antennas arranged in an array antenna, the method comprising:

converting the RF signal received by the receiving antennas into a ranging profile; wherein the ranging profile records the distance between each of the receiving antennas and the target, and the receiving intensity corresponding to the distance;

generating a voxel profile to indicate the relationship between the distance and the receiving intensity in three-dimensional space;

performing a point generation algorithm to generate a plurality of points in three-dimensional space according to the voxel profile and the receiving intensity threshold, wherein the point generation algorithm comprises regarding a coordinate point and the area surrounding the coordinate point as having no point in three-dimensional space in the voxel profile when the difference between the receiving intensity of the coordinate point corresponding to the distance and the receiving intensity around the coordinate point is less than or equal to the receiving intensity threshold, and regarding the coordinate point and the area surrounding the coordinate point as the same point in three-dimensional space in the voxel profile when the difference between the receiving intensity of the coordinate point corresponding to the distance and the receiving intensity around the coordinate point is greater than the receiving intensity threshold; and performing a cluster analysis algorithm to identify a plurality of target points corresponding to the target among the points to obtain the position of the target.

9. The method as claimed in claim 8, wherein performing the cluster analysis algorithm comprises:

regarding one of the points and its neighboring points as being in the same cluster in three-dimensional space when the distance between the one of the points and its neighboring points is within a preset distance; and regarding all points in the cluster in three-dimensional space as target points corresponding to the target when the number of all points included in the cluster is greater than a preset number.

* * * * *